US008380423B2

(12) United States Patent
Cowgill et al.

(10) Patent No.: US 8,380,423 B2
(45) Date of Patent: Feb. 19, 2013

(54) DIAGNOSTIC SYSTEM AND METHOD FOR HYDRAULICALLY-ACTUATED CAM PHASERS

(75) Inventors: Joshua D. Cowgill, Hartland, MI (US); Donovan L. Dibble, Utica, MI (US); Kenneth J. Cinpinski, Ray, MI (US)

(73) Assignee: GM Global Technology Operations LLC

( * ) Notice: Subject to any disclaimer, the term of this patent is extended or adjusted under 35 U.S.C. 154(b) by 785 days.

(21) Appl. No.: 12/548,675

(22) Filed: Aug. 27, 2009

(65) Prior Publication Data

US 2011/0054766 A1   Mar. 3, 2011

(51) Int. Cl.
G06F 19/00 (2006.01)
(52) U.S. Cl. .................. 701/114; 73/114.16; 123/90.15
(58) Field of Classification Search .................. 701/105, 701/111, 114; 123/90.15–90.17, 90.31, 456–458, 123/508, 509; 73/114.16, 114.41, 116.43
See application file for complete search history.

(56) References Cited

U.S. PATENT DOCUMENTS

| 5,937,806 | A  | * | 8/1999  | Lyko et al.    | 123/90.15 |
|-----------|----|---|---------|----------------|-----------|
| 2008/0281453 | A1 | * | 11/2008 | Kortge         | 700/101   |
| 2009/0132146 | A1 | * | 5/2009  | Dibble et al.  | 701/102   |
| 2009/0143963 | A1 | * | 6/2009  | Hendriksma     | 701/114   |
| 2009/0312937 | A1 | * | 12/2009 | Pfeiffer       | 701/105   |
| 2010/0042306 | A1 | * | 2/2010  | Gauthier et al.| 701/102   |
| 2011/0054766 | A1 |   | 3/2011  | Cowgill et al. |           |

* cited by examiner

Primary Examiner — John T. Kwon
Assistant Examiner — Johnny Hoang (57) ABSTRACT

A diagnostic system for an engine includes a phaser control module that commands a first cam phaser position of a cam phaser of the engine for a first period and a second cam phaser position of the cam phaser for a second period, and a phaser diagnostic module that diagnoses a phaser control error for the cam phaser based on a first pressure of fluid supplied by an oil control valve to the cam phaser measured during the first period, and a second pressure of fluid supplied by the oil control valve to the cam phaser measured during the second period. The first and second pressures are measured on one of an advance-side fluid chamber and a retard-side fluid chamber of the cam phaser. The phaser diagnostic module detects one of a phaser mechanical fault and a phaser hydraulic system fault. A related method is also provided.

10 Claims, 4 Drawing Sheets

FIG. 4

DIAGNOSTIC SYSTEM AND METHOD FOR HYDRAULICALLY-ACTUATED CAM PHASERS

FIELD

The present disclosure relates to valve trains for internal combustion engines, and more particularly, to diagnostic systems and methods for diagnosing abnormal operation of cam phasers of the valve trains.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Motor vehicles may include an internal combustion engine that combusts an air and fuel mixture in cylinders and thereby produces drive torque. The engine may include pistons that reciprocate in the cylinders and that are coupled to a crankshaft. The pistons reciprocate in response to the combustion of the air and fuel mixture and thereby cause rotation of the crankshaft.

The engine may further include a valve train that controls the flow of air into and out of the cylinders. The valve train may include a camshaft that selectively opens and closes intake valves and exhaust valves at the appropriate time and thereby controls the air flow. The camshaft may rotate with the crankshaft and thereby control the timing of the opening and closing relative to a position of the pistons within the cylinders.

The valve train may further include a cam phaser coupled to the camshaft and the crankshaft. The cam phaser may be actuated to adjust the rotational position of the camshaft with respect to the crankshaft and thereby adjust the timing of the opening and closing of the intake and exhaust valves relative to the position of the pistons. The cam phaser may be actuated by an oil control valve that directs pressurized oil within the engine to opposite advance-side and retard-side fluid chambers of the cam phaser. The oil control valve may be actuated by an electrical actuator that moves the oil control valve in response to power supplied to the electrical actuator.

SUMMARY

In one form, the present disclosure provides a diagnostic system for an engine that includes a phaser control module that commands a first cam phaser position of a cam phaser of the engine for a first period and a second cam phaser position of the cam phaser for a second period, and a phaser diagnostic module that diagnoses a phaser control error for the cam phaser based on a first pressure of fluid supplied by an oil control valve to the cam phaser measured during the first period, and a second pressure of fluid supplied by the oil control valve to the cam phaser measured during the second period.

In an exemplary implementation, the oil control valve is actuated by an electrical actuator. In the exemplary implementation, a first power is supplied to the electrical actuator during the first period in response to the command for the first cam phaser position, and a second power is supplied to the electrical actuator during the second period in response to the command for the second cam phaser position.

In one feature, the first and second pressures are measured on one of an advance-side fluid chamber of the cam phaser and a retard-side fluid chamber of the cam phaser. In another feature, the first cam phaser position corresponds to a fully advanced position of the cam phaser and the second cam phaser position corresponds to a fully retarded position of the cam phaser.

In further features, the phaser diagnostic module diagnoses the phaser control error based on a difference between a first pressure value determined based on the first pressure and a second pressure value determined based on the second pressure. The first pressure value may be a first average of first pressures of fluid supplied by the oil control valve to the cam phaser measured during the first period. The second pressure value may be a second average of second pressures of the fluid supplied by the oil control valve to the cam phaser measured during the second period. In a related feature, the phaser diagnostic module further diagnoses the phaser control error based on a comparison of the difference and a predetermined threshold. The phaser diagnostic module detects a phaser mechanical fault when the difference is greater than the predetermined threshold. The phaser diagnostic module detects a hydraulic system fault when the difference is less than or equal to the predetermined threshold.

In another form, the present disclosure provides a method for an engine that includes commanding a first cam phaser position of a cam phaser of the engine for a first period, measuring, during the first period, a first pressure of fluid supplied by an oil control valve to the cam phaser in response to the commanding a first cam phaser position, commanding a second cam phaser position of the cam phaser for a second period, measuring, during the second period, a second pressure of fluid supplied by the oil control valve to the cam phaser in response to the commanding a second cam phaser position, and diagnosing a phaser control error for the cam phaser based on the first and second pressures.

In an exemplary implementation, the method further includes supplying, in response to the commanding a first cam phaser position, a first power during the first period to an electrical actuator that actuates the oil control valve. In the exemplary implementation, the method further includes supplying, in response to the commanding a second cam phaser position, a second power to the electrical actuator during the second period.

In one feature, the first and second pressures are measured on one of an advance-side fluid chamber of the cam phaser and a retard-side fluid chamber of the cam phaser. In another feature, the first cam phaser position corresponds to a fully advanced position of the cam phaser and the second cam phaser position corresponds to a fully retarded position of the cam phaser.

In further features, the diagnosing a phaser control error includes diagnosing the phaser control error based on a difference between a first pressure value based on the first pressure and a second pressure value based on the second pressure. The first pressure value may be a first average of first pressures of fluid supplied by the oil control valve to the cam phaser measured during the first period. The second pressure value may be a second average of second pressures of fluid supplied by the oil control valve to the cam phaser measured during the second period.

In a related feature, the diagnosing a phaser control error further includes diagnosing the phaser control error based on a comparison of the difference and a predetermined threshold. The diagnosing a phaser control error includes detecting a phaser mechanical fault when the difference is greater than the predetermined threshold. The diagnosing a phaser control error also includes detecting a hydraulic system fault when the difference is less than or equal to the predetermined threshold.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

The following description is merely exemplary in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical or. It should be understood that steps within a method may be executed in different order without altering the principles of the present disclosure.

As used herein, the term module refers to an Application Specific Integrated Circuit (ASIC), an electronic circuit, a processor (shared, dedicated, or group) and memory that execute one or more software or firmware programs, a combinational logic circuit, and/or other suitable components that provide the described functionality.

The present disclosure provides an exemplary control system and method for diagnosing a cam phaser control error. A cam phaser control error may exist when the cam phaser fails to advance or retard to a commanded position as desired. The exemplary control system and method may be used to detect mechanical faults of the cam phaser and a hydraulic system fault related to oil supply lines and/or the oil control valve that actuates the cam phaser. The mechanical faults of the cam phaser may include a stuck locking pin of the cam phaser and/or a rotor and stator of the cam phaser that are jammed due to debris that has entered the cam phaser. The hydraulic system faults may include clogged oil supply lines and a mechanical failure of the oil control valve.

According to the present disclosure, the faults may be detected by measuring the pressure of the oil supplied to one side of the cam phaser (e.g., retard-side or advance-side) while adjusting the commanded phaser position. More specifically, the faults may be detected by measuring the pressure of the oil supplied to the cam phaser while adjusting the power supplied to the electrical actuator in response to the two commanded positions. The faults may be detected by evaluating whether the measured phaser oil pressure changes by an expected amount when the power supplied to the electrical actuator is adjusted. Mechanical faults of the cam phaser may be detected when the change in the measured phaser oil pressure is greater than a predetermined threshold that is based on the amount of change in the phaser oil pressure that is expected during normal operation of the oil control valve. Hydraulic system faults may be detected when the change in the measured phaser oil pressure is less than or equal to the predetermined threshold.

Figure 1:
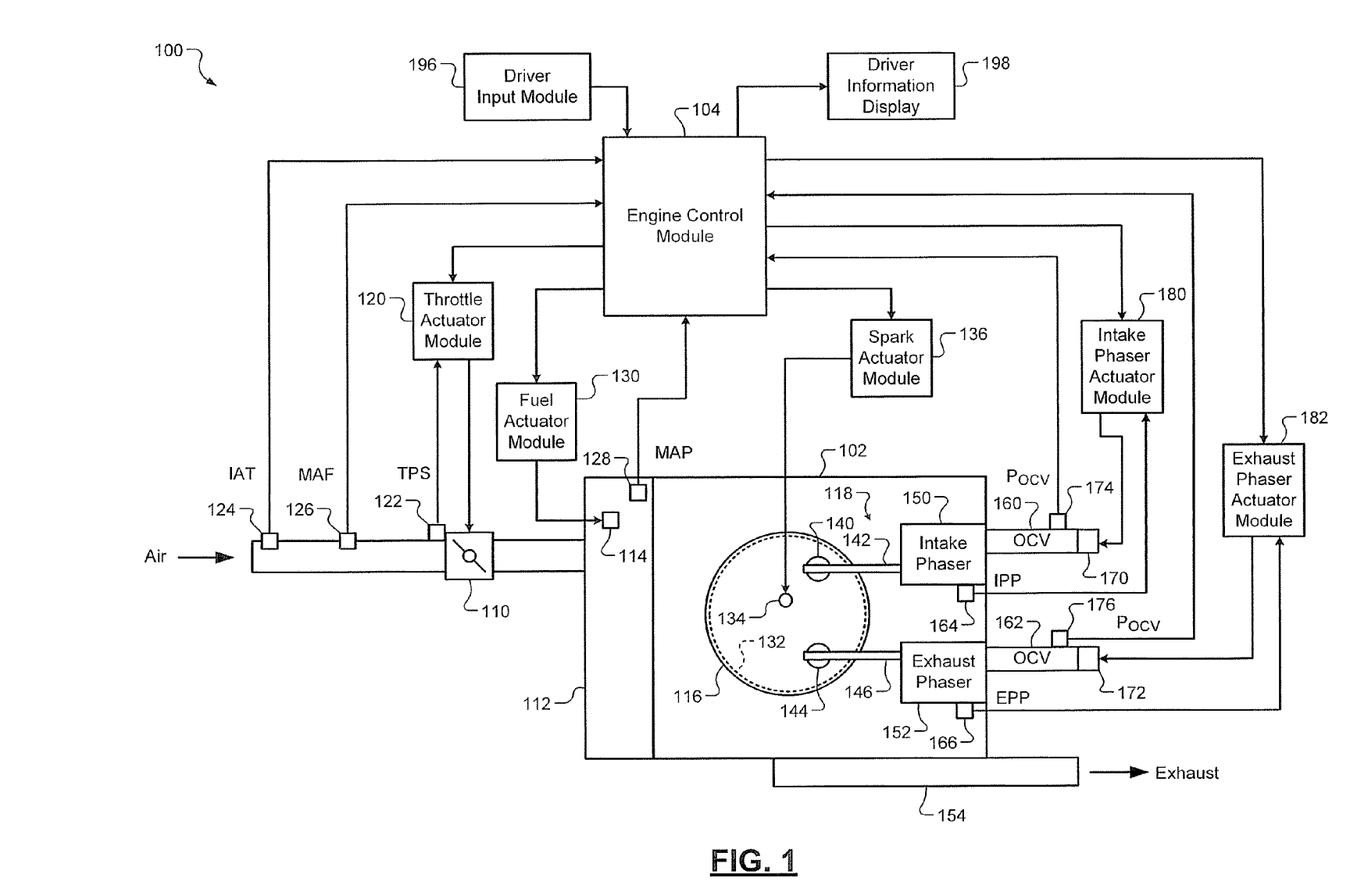
FIG. 1 is a functional block diagram of an exemplary engine system according to the present disclosure.

With particular reference to FIG. 1, an exemplary engine system 100 according to the present disclosure is shown. The engine system 100 includes an internal combustion engine 102 that is regulated by an engine control module (ECM) 104 via actuator modules that control operation of various actuators of the engine 102. For simplicity, the engine 102 shown is a single cylinder engine. It will be appreciated from the discussion that follows that the present disclosure applies equally to engines having multiple cylinders.

The engine 102 combusts a mixture of air and fuel to produce drive torque. The engine 102 includes a throttle 110, an intake manifold 112, a fuel injector 114, a cylinder 116, and a valve train 118. Air is drawn into the engine 102 through the throttle 110 and is distributed to the cylinder 116 by the intake manifold 112.

The throttle 110 may include a butterfly valve that controls the amount of intake air entering the engine 102. A throttle actuator module 120 may control operation of the butterfly valve. The throttle actuator module 120 may control the operation based on control values received from the ECM 104. The throttle actuator module 120 may further control operation based on a position of the butterfly valve sensed by a throttle position (TPS) sensor 122. Intake air temperature (IAT) may be sensed by an IAT sensor 124. Mass air flow (MAF) through the throttle 110 may be sensed by a MAF sensor 126.

The intake manifold 112 distributes the intake air to the cylinder 116. A manifold absolute pressure (MAP) sensor 128 may sense a MAP of the intake air within the intake manifold 112. The fuel injector 114 may inject fuel into the intake manifold 112 that mixes with the intake air therein to form an air/fuel mixture that is combusted in the cylinder 116. A fuel actuator module 130 may control the timing and amount of fuel injected based on control values received from the ECM 104.

The cylinder 116 may include a piston 132 and spark plug 134. The piston 132 may reciprocate within the cylinder 116 and may be coupled to a crankshaft (not shown). The spark plug 134 may be located in the cylinder 116 and may supply a spark that initiates combustion of the air/fuel mixture. A spark actuator module 136 may control the timing of the spark based on control values received from the ECM 104.

The valve train 118 may control the timing and amount of intake air (and fuel mixed with the intake air) entering the cylinder 116. The valve train 118 may include an intake valve 140 actuated by a first camshaft 142, and an exhaust valve 144 actuated by a second camshaft 146. The valve train 118 may further include an intake phaser 150 coupled to the first camshaft 142 and an exhaust phaser 152 coupled to the second camshaft 146.

The intake valve 140 may open to allow air and fuel to enter the cylinder 116 and may close to allow combustion of the air/fuel mixture in the cylinder 116. The first camshaft 142 may rotate with the crankshaft. The first camshaft 142 may be coupled to the crankshaft via a chain or belt. In this manner, the rotation of the first camshaft 142 may be synchronized with the rotation of the crankshaft.

The first camshaft 142 may control the opening and closing of the intake valve 140 relative to the axial position of the piston 132 and/or the rotational position of the crankshaft. For example, the first camshaft 142 may control the opening and closing of the intake valve 140 relative to a top-dead-center (TDC) position of the piston 132.

The exhaust valve 144 may close to allow combustion and may open to allow exhaust produced during combustion to exit the cylinder 116 into an exhaust system 154. The second camshaft 146 may rotate with the crankshaft and may control the opening and closing of the exhaust valve 144. The second camshaft 146 may be coupled to the crankshaft in a similar manner to the first camshaft 142. The second camshaft 146 may control the opening and closing of the exhaust valve 144 relative to the TDC position of the piston 132 and/or the corresponding rotational position of the crankshaft.

The intake and exhaust phasers 150, 152 may also control the timing of the opening and closing of the intake and exhaust valves 140, 144, respectively, by controlling phase angles between the first and second camshafts 142, 146 and the crankshaft. The intake and exhaust phasers 150, 152 may control the timing by adjusting the rotational position of the first and second camshafts 142, 146, respectively, relative to the rotational position of the crankshaft. For example, the intake and exhaust phasers 150, 152 may advance or retard the rotational position of the camshafts 142, 146 with respect to the crankshaft. By adjusting the phase angles in the foregoing manner, the intake and exhaust phasers 150, 152 may advance or retard the opening and closing of the intake and exhaust valves 140, 144 with respect to TDC.

Figure 3:
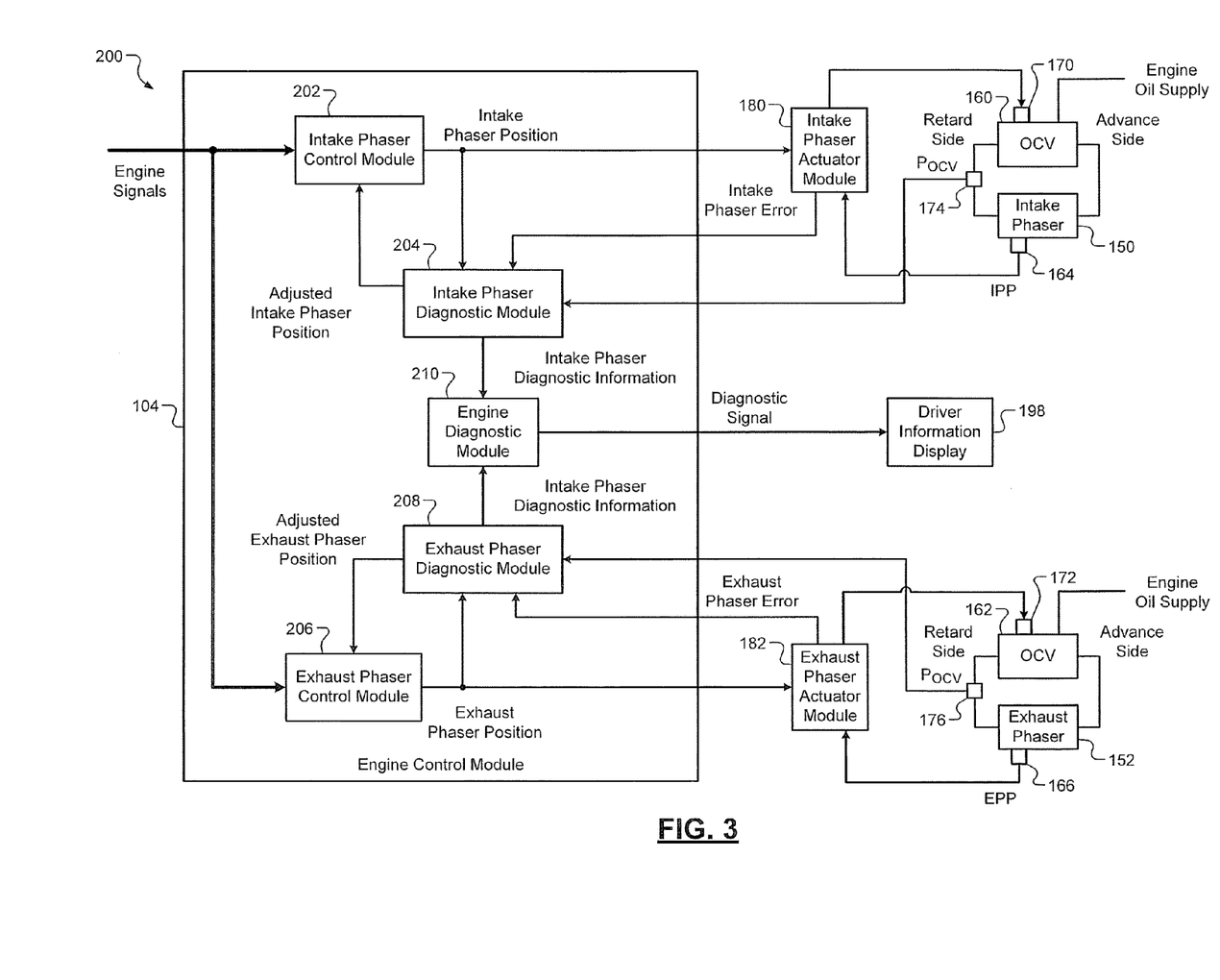
FIG. 3 is a functional block diagram of an exemplary cam phaser control and diagnostic system according to the present disclosure.

The intake and exhaust phasers 150, 152 may include, respectively, oil control valves (OCVs) 160, 162, phaser position sensors 164, 166, electric actuators 170, 172, and phaser oil pressure sensors 174, 176. The OCVs 160, 162 may be variable displacement, three-way valves that direct pressurized oil supplied by the engine oil supply between retard-side and advance-side fluid chambers of the intake and exhaust phasers 150, 152 (FIG. 3).

The pressurized fluid may cause rotational displacement between a stator element (not shown) that is coupled to the crankshaft and a rotor element (not shown) disposed in the stator element that is coupled to a corresponding camshaft. Rotational displacement of the rotor element within the stator element causes a corresponding change in the phase angle. The rotational displacement or phase angle of the intake phaser 150 may be measured by the phaser position sensor 164. The phaser position sensor 164 may output an intake phaser position (IPP) signal based on the intake phaser position sensed. The rotational displacement or phase angle of the exhaust phaser 152 may be measured by the phaser position sensor 166. The phaser position sensor 166 may output an exhaust phaser position (EPP) signal based on the exhaust phaser position sensed.

In a fully retarded position, the OCVs 160, 162 direct pressurized oil supplied to the valves to the retard-side fluid chambers. In a fully advanced position, the OCVs 160, 162 direct pressurized oil supplied to the valves to the advance-side fluid chambers. At positions in between, the OCVs 160, 162 distribute the pressurized oil to either the advance-side or retard-side fluid chambers in proportion to the positions of the OCVs 160, 162.

The electrical actuators 170, 172 actuate the OCVs 160, 162 in response to power supplied and thereby cause pressurized fluid to be directed to the retard-side and advance-side fluid chambers. The position of the OCVs 160, 162 may be proportional to a duty cycle of the power supplied to the electrical actuators 170, 172.

An intake phaser actuator module 180 may regulate the power supplied to the electrical actuator 170 for the intake phaser 150 and thereby regulate the position of the OCV 160. The intake phaser actuator module 180 may regulate the power supplied based on control values received from the ECM 104. The intake phaser actuator module 180 may also monitor the intake phaser position sensed by the phaser position sensor 164 and generate an intake phaser error signal indicating whether an intake phaser control error has been detected. An intake phaser control error may be detected when, for example, the intake phaser position sensed by the phaser position sensor 164 is not within a predetermined range of the intake phaser position commanded by the ECM 104 within a predetermined response period.

An exhaust phaser actuator module 182 may regulate the power supplied to the electrical actuator 172 for the exhaust phaser 152 and thereby regulate the position of the OCV 162. The exhaust phaser actuator module 182 may regulate the power supplied based on control values received from the ECM 104. The exhaust phaser actuator module 182 may also monitor the exhaust phaser position sensed by the phaser position sensor 166 and generate an exhaust phaser error signal indicating whether an exhaust phaser control error has been detected. An exhaust phaser control error may be detected when, for example, the exhaust phaser position sensed by the phaser position sensor 166 is not within a predetermined range of the exhaust phaser position commanded by the ECM 104 within a predetermined response period.

According to the present disclosure, the phaser oil pressure sensors 174, 176 may be in fluid communication with either the advance-side or retard-side fluid chamber of a corresponding one of the intake and exhaust phasers 150, 152. The phaser oil pressure sensors 174, 176 may sense a pressure of the oil supplied to the corresponding cam phaser and each may generate an output signal in response to the pressure sensed. In an exemplary embodiment, the phaser oil pressure sensors 174, 176 are in fluid communication with the retard-side fluid chambers of the intake and exhaust phasers 150, 152 (FIG. 3).

Figure 2:
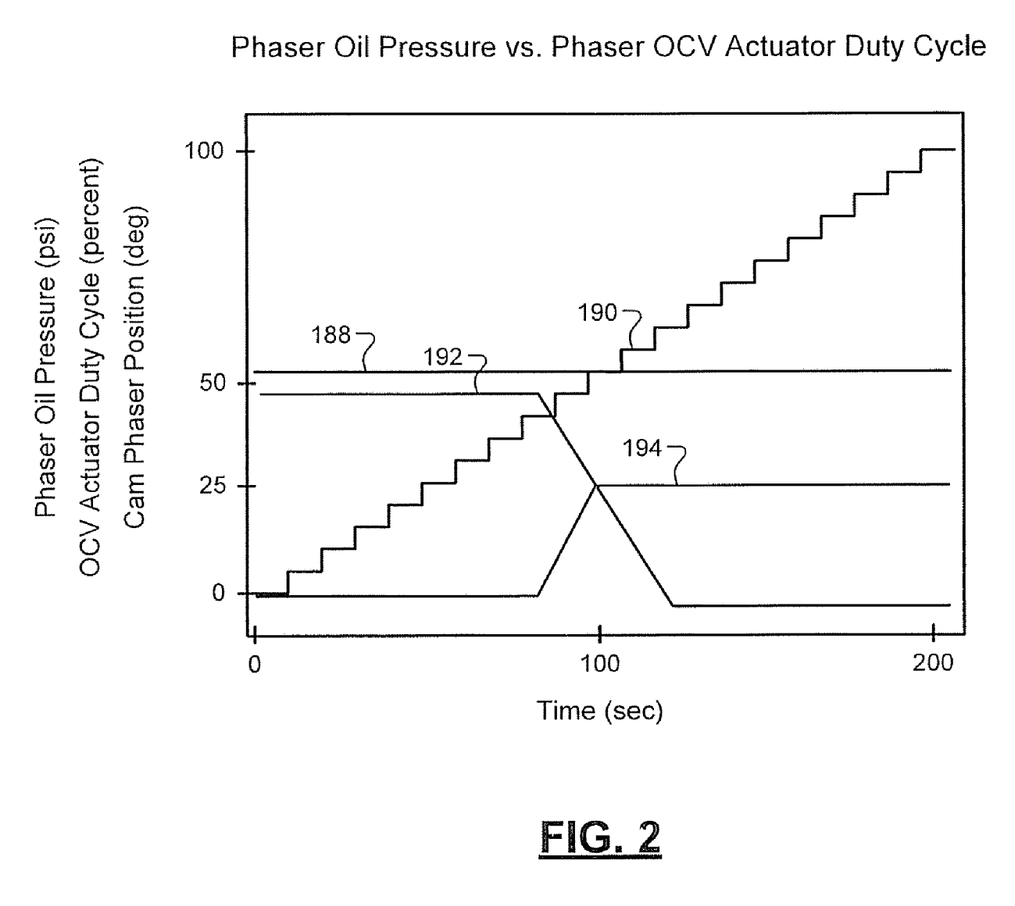
FIG. 2 is a chart illustrating phaser oil pressure as a function of oil control valve actuator duty cycle for the cam phasers shown in FIG. 1.

With particular reference to FIG. 2, a chart illustrating phaser oil pressure as a function of OCV actuator (i.e., electrical actuators 170, 172) duty cycle is provided. The chart illustrates the change in phaser oil pressure and phaser position (i.e., phase angle) as a function of the duty cycle during normal operation of the cam phasers, including the OCVs. For simplicity, the chart illustrates the phaser oil pressure for the retard-side fluid chamber and the corresponding phaser position of one of the cam phasers (i.e., intake and exhaust phasers 150, 152). The chart includes an engine oil pressure trace 188, an OCV actuator duty cycle trace 190, a phaser oil pressure trace 192, and a phaser position trace 194.

As seen in the chart, the phaser oil pressure remains at pressures near the engine oil pressure at duty cycles below around forty percent. The difference between the phaser oil pressure and engine oil pressure may be due to frictional losses due to the flow of the pressurized oil within the engine 102. Between duty cycles of around forty percent and fifty percent, the phaser oil pressure decreases in proportion to increases in the duty cycle. As further seen in the chart, the phaser position begins to advance in response to the reduction in the phaser oil pressure. At duty cycles above around fifty percent, the phaser oil pressure remains near zero and the phaser position remains in the fully advanced position.

The chart in FIG. 2 illustrates that during normal operation of the oil control valve, the phaser oil pressure changes in a predictable manner based on the level of power supplied to the electrical actuator that actuates the oil control valve. When the oil control valve is functioning properly, the change in phaser oil pressure may be at or near an expected change in the pressure, regardless of whether other working components of the cam phaser are functioning properly. When the oil control valve is not functioning properly, the change in phaser oil pressure may be less than the expected change in pressure, regardless of whether the other working components are functioning properly. Accordingly, a threshold pressure difference may be determined such that mechanical faults may be distinguished from hydraulic system faults by comparing the phaser oil pressure generated in response to changes in the level of power supplied to the electrical actuator.

Referring again to FIG. 1, the ECM 104 may regulate operation of the engine 102 based on driver inputs received from a driver input module 196. The ECM 104 may further regulate operation based on signals generated by one or more of the sensors included with the engine, such as the sensors previously discussed herein. Collectively, the signals generated by the engine sensors will be referred to hereinafter and in the drawings as "engine signals".

The ECM 104 may control the control values that are output as commands to the various actuator modules in order to generate a desired torque from the engine 102. The ECM 104 may also monitor operation of the engine system 100 and may detect faults or errors in the operation. When a fault or error is detected, the ECM 104 may selectively adjust one or more of the control values during a cam phaser diagnostic test performed to diagnose the fault or error. The ECM 104 may communicate diagnostic information obtained during the cam phaser diagnostic test to a driver information display 198 that displays an operational status of the operation. Based on the diagnostic information obtained, the ECM 104 may selectively adjust one or more of the control values to compensate for the fault detected and thereby adjust the operating conditions of the engine 102.

With particular reference to FIG. 3, an exemplary implementation of the ECM 104 in a phaser control and diagnostic system 200 is shown. The phaser control and diagnostic system 200 regulates operation of the intake and exhaust phasers 150, 152 and diagnoses faults when a control error in the operation of the intake and exhaust phasers 150, 152 is detected.

The ECM 104 regulates operation of the intake and exhaust phasers 150, 152 by controlling phaser control values that are output to the intake and exhaust phaser actuator modules 180, 182. The phaser control values include an intake phaser position and an exhaust phaser position. The ECM 104 also monitors operation of the intake and exhaust phasers 150, 152 and diagnoses problems that may cause an intake and/or exhaust phaser control error. In particular, the ECM 104 may detect mechanical and hydraulic faults related to the cam phasers during the cam phaser diagnostic test. The cam phaser diagnostic test may be performed when the phaser control error is detected. The ECM 104 may selectively adjust the phaser control values during the cam phaser diagnostic test.

The ECM 104 may include an intake phaser control module 202, an intake phaser diagnostic module 204, an exhaust phaser control module 206, an exhaust phaser diagnostic module 208, and an engine diagnostic module 210. The intake phaser control module 202 receives one or more of the engine signals and an adjusted intake phaser position request generated by the intake phaser diagnostic module 204. The intake phaser control module 202 determines the intake phaser position based on the engine signals and the adjusted intake phaser position requests received. The intake phaser control module 202 may selectively adjust the intake phaser position based on the adjusted intake phaser position request. The intake phaser control module 202 outputs the intake phaser position to the intake phaser actuator module 180.

The intake phaser diagnostic module 204 receives the intake phaser error signal, the pressure signal generated by the phaser oil pressure sensor 174, and the intake phaser position. Based on the foregoing signals, the intake phaser diagnostic module 204 generates the adjusted intake phaser position request. When the intake phaser error signal indicates a control error has been detected, the intake phaser diagnostic module 204 may work together with the intake phaser control module 202 to perform a diagnostic test of the OCV 160 and the intake phaser 150. The intake phaser diagnostic module 204 generates intake phaser diagnostic information based on pressures sensed by the phaser oil pressure sensor 174 during the diagnostic test.

The exhaust phaser control module 206 receives one or more of the engine signals and an adjusted exhaust phaser position request generated by the exhaust phaser diagnostic module 208. The exhaust phaser control module 206 determines the exhaust phaser position based on the engine signals and the adjusted exhaust phaser position requests received. The exhaust phaser control module 206 may selectively adjust the exhaust phaser position based on the adjusted exhaust phaser position request. The exhaust phaser control module 206 outputs the exhaust phaser position to the exhaust phaser actuator module 182.

The exhaust phaser diagnostic module 208 receives the exhaust phaser error signal, the signal generated by the phaser oil pressure sensor 176, and the exhaust phaser position. Based on the foregoing signals, the exhaust phaser diagnostic module 208 generates the adjusted exhaust phaser position request. When the exhaust phaser error signal indicates a control error has been detected, the exhaust phaser diagnostic module 208 may work together with the exhaust phaser control module 206 to perform a diagnostic test of the OCV 162 and the exhaust phaser 152. The diagnostic test of the OCV 162 and the exhaust phaser 152 may be substantially similar to the test performed by the intake phaser diagnostic module 204. The exhaust phaser diagnostic module 208 generates exhaust phaser diagnostic information based on pressures sensed by the phaser oil pressure sensor 176 during the diagnostic test.

The engine diagnostic module 210 receives the intake and exhaust diagnostic information. Based on the diagnostic information received, the engine diagnostic module 210 may output a diagnostic signal to the driver information display 198 to illuminate a malfunction indicator lamp corresponding to the fault detected. For example, when a mechanical and/or hydraulic fault related to the intake and exhaust phasers 150, 152 has been detected, the engine diagnostic module 210 may generate the diagnostic signal to illuminate a check engine lamp.

With continued reference to FIG. 3, operation of the phaser control and diagnostic system 200 according to the present disclosure will now be described. During regular operation of the engine 102, the ECM 104 determines and outputs the intake and exhaust phaser positions such that a desired torque output of the engine 102 may be achieved. In response to the intake and exhaust phaser positions commanded by the ECM 104, the intake and exhaust phaser actuator modules 180, 182 output power to the electrical actuators 170, 172 corresponding to the commanded positions.

The intake and exhaust phaser actuator modules 180, 182 monitor the phaser positions sensed by the phaser position sensors 164, 166 in order to determine whether the commanded positions have been achieved within corresponding expected response periods. When the intake phaser 150 does not achieve the commanded intake phaser position within the expected response period, the intake phaser actuator module 180 generates the intake phaser error to indicate a control error has been detected in the operation of the intake phaser 150. Similarly, when the exhaust phaser 152 does not achieve the commanded exhaust phaser position within the expected response period, the exhaust phaser actuator module 182 generates the exhaust phaser error to indicate a control error has been detected in the operation of the exhaust phaser 152.

The intake and exhaust phaser diagnostic modules 204, 208 monitor the intake and exhaust phaser error signals. When the intake phaser error signal switches from indicating no control error to indicating a control error has been detected, the intake phaser diagnostic module 204 may work together with the intake phaser control module 202 to perform a diagnostic test of the OCV 160 and the intake phaser 150. Similarly, when the exhaust phaser error signal switches from indicating no control error to indicating a control error has been detected, the exhaust phaser diagnostic module 208 may work together with the exhaust phaser control module 206 to perform a diagnostic test of the OCV 162 and the exhaust phaser 152.

Operation of the intake phaser control and diagnostic modules 202, 204 and the exhaust phaser control and diagnostic modules 206, 208 during the corresponding diagnostic tests may be substantially similar. Accordingly, for brevity, only operation during the diagnostic test of the OCV 160 and intake phaser 150 will be described in detail.

During the diagnostic test, the intake phaser diagnostic module 204 may generate a first request to command a first adjusted intake phaser position for a first period and a second request to command a second adjusted intake phaser position for a second period. In the exemplary embodiment, the first adjusted intake phaser position corresponds to one of the fully retarded position and the fully advanced position of the intake phaser 150. The second adjusted intake phaser position corresponds to the other of the fully retarded position and the fully advanced position.

Alternately, the first and second adjusted intake phaser positions may correspond to other positions between the fully retarded and fully advanced positions. When generating the first adjusted phaser position request, the intake phaser diagnostic module 204 may choose between the fully retarded and fully advanced positions based on which position is closest to the position of the intake phaser 150 indicated by the phaser position sensor 164 at the time the first request is made.

Upon receiving the requests for the first adjusted phaser position, the intake phaser control module 202 determines whether to enable the diagnostic test. The intake phaser control module 202 may enable the diagnostic test when enablement conditions are met. The enablement conditions may depend on the current operating conditions of the engine 102 and/or the desired torque output.

When the diagnostic test is enabled, the intake phaser control module 202 outputs the intake phaser position such that the first adjusted intake phaser position is commanded for the first period and the second adjusted intake phaser position is commanded for the second period. During the first and second periods, the intake phaser actuator module 180 supplies power to the electrical actuator 170 at levels corresponding to the first and second adjusted intake phaser positions commanded.

During the diagnostic test, the intake phaser diagnostic module 204 monitors the pressure sensed by the phaser oil pressure sensor 174. The intake phaser diagnostic module 204 determines a first phaser oil pressure ($P_{OCV1}$) and a second phaser oil pressure ($P_{OCV2}$) based on the pressures sensed during the first and second periods, respectively. The first and second phaser oil pressures, $P_{OCV1}$ and $P_{OCV2}$, each may be equal to a single pressure or an average of the pressures sensed within or after an expected response time of the OCV 160. The intake phaser diagnostic module 204 generates the intake phaser diagnostic information based on a comparison of the first and second oil pressures, $P_{OCV1}$ and $P_{OCV2}$.

If an absolute pressure difference ($\Delta P_{OCV}$) between the first and second phaser oil pressures, $P_{OCV1}$ and $P_{OCV2}$, is greater than a predetermined pressure threshold ($\Delta P_{Threshold}$), the intake phaser diagnostic module 204 generates the intake phaser diagnostic information to indicate a mechanical fault with the intake phaser 150 has been detected. If the absolute pressure difference, $\Delta P_{OCV}$, is less than or equal to the predetermined pressure threshold, $\Delta P_{Threshold}$, the intake phaser diagnostic module 204 generates the intake phaser diagnostic information to indicate a fault in the hydraulic system for the intake phaser 150 has been detected. The intake phaser diagnostic information may be output to the engine diagnostic module 210.

In general, the predetermined pressure threshold, $\Delta P_{Threshold}$, will be based on an expected difference in the phaser oil pressure between the first and second adjusted intake phaser positions during normal operation of the intake phaser 150, including the OCV 160. Since the expected difference in phaser oil pressure may be based on the pressure of the oil supplied to the OCV 160, the predetermined pressure threshold, $\Delta P_{Threshold}$, may also be based on the engine oil pressure during the diagnostic test.

From the foregoing, it will be appreciated that the phaser control and diagnostic system 200 may detect mechanical faults in the operation of the intake and exhaust cam phasers 150, 152 and hydraulic system faults in the operation of the OCVs 160, 162. When a control error is detected, the phaser control and diagnostic system 200 may command first and second adjusted cam phaser positions that cause power to be supplied to the electrical actuators 170, 172 at levels corresponding to the commanded positions. The phaser control and diagnostic system 200 detects the faults by comparing the phaser oil pressure measured while commanding the first adjusted cam phaser position and the phaser oil pressure measured while commanding the second adjusted cam phaser position. More specifically, the phaser control and diagnostic system 200 compares a pressure difference that is based on the pressures measured while commanding the two cam phaser positions and a predetermined pressure threshold that is based on an expected difference in the phaser oil pressure. The phaser control and diagnostic system 200 detects and thereby distinguishes mechanical and hydraulic system faults based on the comparison.

Figure 4:
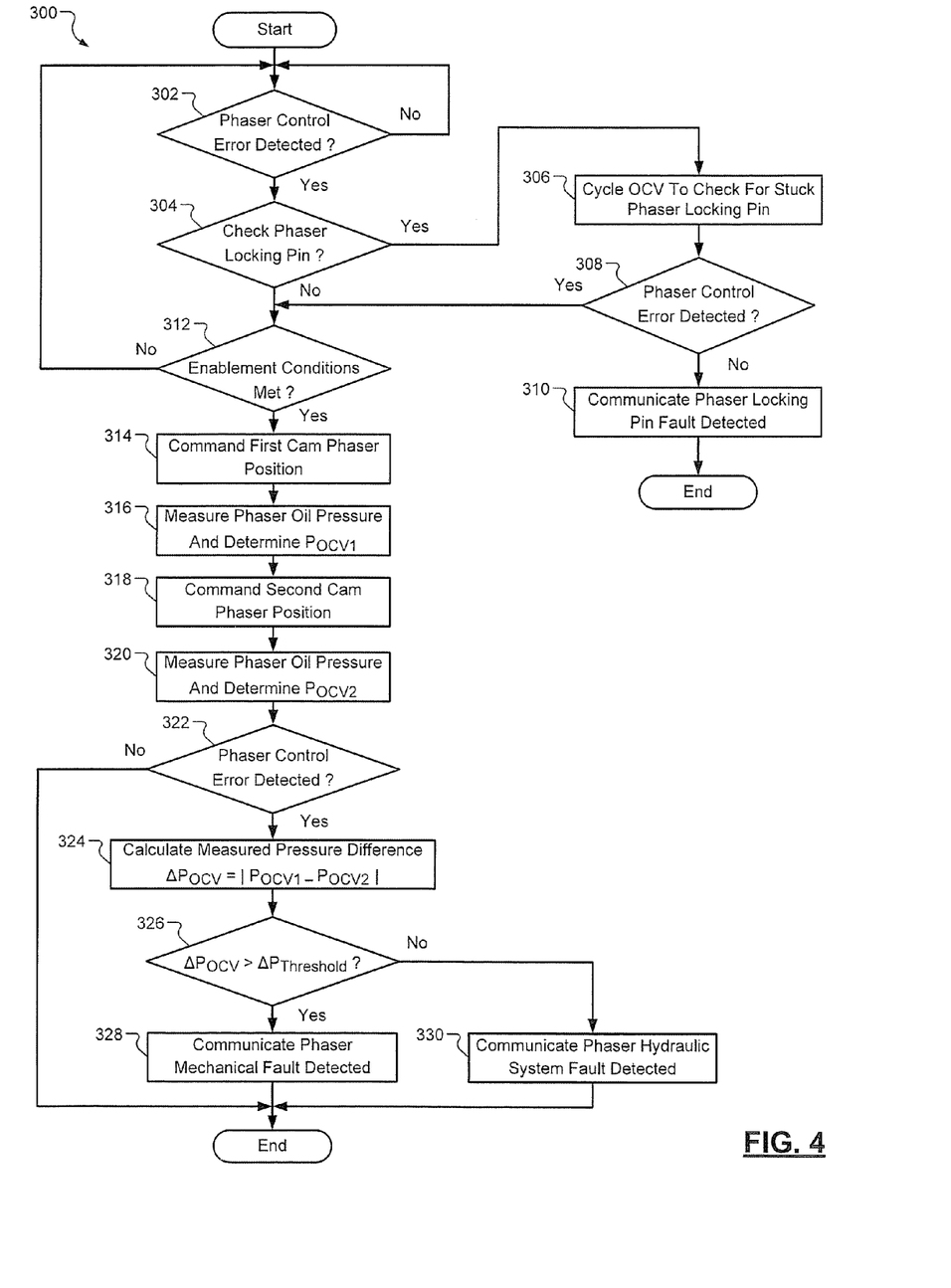
FIG. 4 is a flow diagram illustrating exemplary control steps in a method for diagnosing a cam phaser control error according to the present disclosure.

With particular reference to FIG. 4, an exemplary method 300 for controlling a cam phaser of an engine and diagnosing a cam phaser error according to the present disclosure is shown. The method 300 may be used to diagnose a control error detected during operation of the cam phaser. More specifically, the method 300 may be used to diagnose control errors of a cam phaser that is hydraulically actuated by a three-way oil control valve. It will be appreciated from the following discussion that the oil control valve may be actuated by an electrical actuator and the electrical actuator may be supplied power at a level corresponding to the cam phaser position commanded according to the method 300. The method 300 may be used to diagnose mechanical faults and hydraulic system faults that may be the cause of the control error.

The method 300 may be implemented in an engine control system, such as the engine system 100 previously described herein. The method 300 may be implemented in one or more modules of the engine system 100, such as the ECM 104. Accordingly, the method 300 will be described with reference to components of the engine system 100 where appropriate.

Control under the method 300 begins in step 302 where control determines whether a cam phaser control error is detected. A cam phaser control error may be detected when the cam phaser (e.g., intake phaser 150, exhaust phaser 152) does not achieve a desired cam phaser position within an expected response period. If a cam phaser control error is detected, then control proceeds in step 304, otherwise control loops back as shown.

In step 304, control determines whether to check the cam phaser for a stuck locking pin. According to the present disclosure, control may proceed in step 312 without checking for a stuck locking pin. If control decides to check for a stuck locking pin, control may proceed to check for a stuck locking pin by any one of known methods. For exemplary purposes, steps 306-310 are provided.

In step 306, control may rapidly cycle the oil control valve (e.g., OCV 160, OCV 162) by alternately commanding fully advanced and fully retarded positions of the cam phaser in rapid succession for a period. Control may cycle the oil control valve in the foregoing manner in order to free a stuck cam phaser locking pin. Subsequently, in step 308, control may determine whether the control error is still detected. If a control error is still detected, control proceeds in step 312, otherwise control continues in step 310. In step 310, control communicates a phaser locking pin fault was previously detected. Control may further communicate the phaser locking pin fault is no longer detected. Control under the method 300 may end in step 310.

Control may proceed in step 312 where control determines whether enablement conditions are met. If the enablement conditions are met, then control proceeds in step 314, otherwise control loops back as shown. The enablement conditions may depend on the current operating conditions of the engine 102 and/or the desired torque output. In general, the enablement conditions may be met when control determines control may proceed without an undesirable impact on engine torque output. The enablement conditions may further depend on whether a problem has been detected such that one or more of the components of the engine system and/or control values used in the method 300 may be unreliable. For example, the enablement conditions may not be met when a problem has been detected with the electrical actuator for the oil control valve and/or the pressure sensor used to measure phaser oil pressure.

In step 314 control commands a first cam phaser position for a first period. During the first period, power is supplied to the electrical actuator at a level corresponding to the first cam phaser position. The first cam phaser position may correspond to one of a fully advanced or a fully retarded position of the cam phaser.

In step 316 control measures the phaser oil pressure on one of the advance-side or retard-side fluid chambers of the cam phaser during the first period. For exemplary purposes, control measures the phaser oil pressure on the retard-side fluid chamber of the cam phaser. Based on the pressure measured, control determines a first measured phaser oil pressure ($P_{OCV1}$). The first measured phaser oil pressure, $P_{OCV1}$, may be equal to the pressure measured at a predetermined point in time within the first period that accounts for an expected response time of the oil control valve. The expected response time may be based on the change in the level of power supplied in response to the command for the first cam phaser position. Alternately, the first measured phaser oil pressure, $P_{OCV1}$, may be equal to an average of pressures measured during the first period within or after the expected response time.

In step 318, control commands a second cam phaser position different from the first cam phaser position for a second period following the first period. During the second period, power is supplied to the electrical actuator at a level corresponding to the second cam phaser position. The second cam phaser position may be an opposite one of the fully advanced or fully retarded position commanded as the first cam phaser position.

In step 320, control measures the phaser oil pressure on the retard-side fluid chamber of the cam phaser during the second period. Based on the pressure measured, control determines a second measured phaser oil pressure ($P_{OCV2}$). Control determines the second measured phaser oil pressure, $P_{OCV2}$, in a manner substantially similar to the manner in which control determined the first measure phaser oil pressure, $P_{OCV1}$. As such, control may determine the second measured phaser oil pressure, $P_{OCV2}$, based on a single measured pressure or an average of pressures measured during the second period. The pressures may be measured within the second period to account for the expected response time of the oil control valve in moving in response to the change in the levels of power corresponding to the first and second cam phaser positions commanded.

In step 322, control determines whether a cam phaser control error is still detected. The cam phaser control error may be detected when the cam phaser does not achieve the second cam phaser position commanded in step 318 within an expected response period. If a cam phaser control error is still detected, then control proceeds in step 324, otherwise control ends as shown. Control may determine whether a cam phaser control error is still detected in step 322 as a check to see that diagnosis of the cam phaser control error detected in step 302 is still desired and to avoid misdetecting a fault.

In step 324, control calculates an absolute measured pressure difference ($\Delta P_{OCV}$) between the first and second measured phaser oil pressures, $P_{OCV1}$ and $P_{OCV2}$, and control proceeds in step 326.

In step 326, control compares the measured pressure difference, $\Delta P_{OCV}$, and a threshold pressure difference ($\Delta P_{Threshold}$). If the measured pressure difference, $\Delta P_{OCV}$, is greater than the threshold pressure difference, $\Delta P_{Threshold}$, then control proceeds in step 328, otherwise control proceeds in step 330.

The threshold pressure difference, $\Delta P_{Threshold}$, may be a predetermined threshold pressure difference stored in memory. The threshold pressure difference may be based on an expected pressure difference ($\Delta P_{Expected}$). The expected pressure difference, $\Delta P_{Expected}$, may correspond to an absolute difference between a first expected phaser oil pressure (P1) at the first cam phaser position and a second expected phaser oil pressure (P2) at the second cam phaser position. The first and second expected phaser oil pressures, P1 and P2, may be based on a measured block oil pressure during the first and second periods. Accordingly, the threshold pressure difference, $\Delta P_{Threshold}$, may be a predetermined value stored in memory based on the expected pressure difference, $\Delta P_{Expected}$. Alternately, the threshold pressure difference, $\Delta P_{Threshold}$, may be a single value stored in memory.

In step 328, control communicates a mechanical fault of the cam phaser has been detected and control under the method 300 ends.

In step 330, control communicates a hydraulic system fault of the cam phaser has been detected and control under the method 300 ends.

The broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification, and the following claims.

What is claimed is:

1. A diagnostic system for an engine comprising:
a phaser control module that commands a first cam phaser position of a cam phaser of said engine for a first period and a second cam phaser position of said cam phaser for a second period; and
a phaser diagnostic module that:
diagnoses a phaser control error for said cam phaser based on a first pressure of fluid supplied by an oil control valve (OCV) to said cam phaser measured during said first period, and a second pressure of fluid supplied by said OCV to said cam phaser measured during said second period,
distinguishes a mechanical fault in said cam phaser from a hydraulic fault in said cam phaser by comparing a difference between said first pressure and said second pressure to a predetermined threshold,
detects a mechanical fault in said cam phaser when said difference is greater than said predetermined threshold, and
detects a hydraulic fault in said cam phaser when said difference is less than or equal to said predetermined threshold.

2. The diagnostic system of claim 1 wherein said OCV is actuated by an electrical actuator, and wherein a first power is supplied to said electrical actuator during said first period in response to said command for said first cam phaser position and a second power is supplied to said electrical actuator during said second period in response to said command for said second cam phaser position.

3. The diagnostic system of claim 1 wherein said first and second pressures are measured on one of an advance-side fluid chamber of said cam phaser and a retard-side fluid chamber of said cam phaser.

4. The diagnostic system of claim 1 wherein said first cam phaser position corresponds to a fully advanced position of said cam phaser and said second cam phaser position corresponds to a fully retarded position of said cam phaser.

5. The diagnostic system of claim 1 wherein said first pressure value is a first average of first pressures of fluid supplied by said OCV to said cam phaser measured during said first period and said second pressure value is a second average of second pressures of said fluid supplied by said OCV to said cam phaser measured during said second period.

6. A method for an engine comprising:
commanding a first cam phaser position of a cam phaser of said engine for a first period;
measuring, during said first period, a first pressure of fluid supplied by an oil control valve (OCV) to said cam phaser in response to said commanding a first cam phaser position;
commanding a second cam phaser position of said cam phaser for a second period;
measuring, during said second period, a second pressure of fluid supplied by said OCV to said cam phaser in response to said commanding a second cam phaser position;
diagnosing a phaser control error for said cam phaser based on said first and second pressures;
distinguishing a mechanical fault in said cam phaser from a hydraulic fault in said cam phaser by comparing a difference between said first pressure and said second pressure to a predetermined threshold;
detecting a mechanical fault in said cam phaser when said difference is greater than said predetermined threshold; and
detecting a hydraulic fault in said cam phaser when said difference is less than or equal to said predetermined threshold.

7. The method of claim 6 further comprising supplying, in response to said commanding a first cam phaser position, a first power during said first period to an electrical actuator that actuates said OCV, and supplying, in response to said commanding a second cam phaser position, a second power to said electrical actuator during said second period.

8. The method of claim 6 wherein said first and second pressures are measured on one of an advance-side fluid chamber of said cam phaser and a retard-side fluid chamber of said cam phaser.

9. The method of claim 6 wherein said first cam phaser position corresponds to a fully advanced position of said cam phaser and said second cam phaser position corresponds to a fully retarded position of said cam phaser.

10. The method of claim 6 wherein said first pressure value is a first average of first pressures of fluid supplied by said OCV to said cam phaser measured during said first period, and said second pressure value is a second average of second pressures of said fluid supplied by said OCV to said cam phaser measured during said second period.

* * * * *